(12) United States Patent
Chang et al.

(10) Patent No.: US 7,058,208 B2
(45) Date of Patent: Jun. 6, 2006

(54) METHOD AND APPARATUS OF MANAGING INFORMATION ABOUT A PERSON

(75) Inventors: Ying-Hui Chang, Taipei (TW); Yuan-Fu Liao, Nantou (TW); Li-Fen Yeh, Taipei (TW); Jyh-Kuen Horng, Taipei (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 590 days.

(21) Appl. No.: 10/122,464

(22) Filed: Apr. 15, 2002

(65) Prior Publication Data

US 2003/0035567 A1 Feb. 20, 2003

(30) Foreign Application Priority Data

Apr. 17, 2001 (EP) .................................. 01201393

(51) Int. Cl.
*G06K 9/00* (2006.01)
(52) U.S. Cl. ...................... 382/115; 382/305; 704/246; 379/265.13
(58) Field of Classification Search ................ 382/115, 382/118, 155, 156, 190, 181, 305; 340/540, 340/573.1, 573; 702/180, 188; 704/275, 704/270.1, 246, 247, 251, 231; 715/700, 715/728, 727, 764, 961; 434/308, 156, 319; 600/586, 590, 595; 379/265.13
See application file for complete search history.

(56) References Cited

U.S. PATENT DOCUMENTS 5,617,855 A * 4/1997 Waletzky et al. ........... 600/586

| | | | |
|---|---|---|---|
| 6,173,260 B1 * | 1/2001 | Slaney | 704/250 |
| 6,487,531 B1 * | 11/2002 | Tosaya et al. | 704/246 |
| 6,522,333 B1 * | 2/2003 | Hatlelid et al. | 345/474 |
| 6,611,206 B1 * | 8/2003 | Eshelman et al. | 340/573.1 |
| 6,728,679 B1 * | 4/2004 | Strubbe et al. | 704/270.1 |
| 6,795,808 B1 * | 9/2004 | Strubbe et al. | 704/275 |
| 6,804,391 B1 * | 10/2004 | Blake et al. | 382/159 |

FOREIGN PATENT DOCUMENTS

DE 19502627 A 8/1996
DE 19801666 A 7/1999

OTHER PUBLICATIONS

De Siva et al., "Facial Emotion Recognition Using Multi-Modal Information", Conference Proceedings of ICICS 1997, International Conference on Information, Communications and Signal Processing, IEEE, vol. 1, pp. 397-401.

* cited by examiner

*Primary Examiner*—Sheela Chawan
(74) *Attorney, Agent, or Firm*—Larry Liberchuk (57) ABSTRACT

A method and an electronic device (preferably a Personal Digital Assistant, PDA or a palm computer) for providing information about a physical person, comprising: a microphone for recording audio data and/or a camera for recording image data of the physical person. A processor with a memory for processing the audio and/or visual data to recognize the identity of the physical person and retrieving the stored information about the recognized identity is provided. A user interface is used to deliver the stored information to a user. The information may comprise business card information and/or other information about the person. Moreover, information representative of the person's emotional/personal status/mood may be recorded, retrieved, and provided to the user via the user interface.

12 Claims, 6 Drawing Sheets

METHOD AND APPARATUS OF MANAGING INFORMATION ABOUT A PERSON

This invention relates to an apparatus for providing information about a physical person, comprising a recorder for recording audio and/or image data on the physical person.

Moreover, the invention relates to a method of providing information about a physical person, comprising the steps of recording audio/image data of the physical person.

Various technical solutions to process recordings of facial and vocal expressions of people have been proposed in the prior art. Results of the processing have been used to identify persons—among others for access control applications. Such applications have for instance been based on recognising users on the basis of either voice (speaker recognition) or face recognition techniques. Further, various techniques have been proposed for recognising a mood or an emotional state of a person.

Conference Proceedings of ICICS 1997, International Conference on Information, Communications and Signal Processing (IEEE, vol. 1, pp. 397–401) discloses a computer multimedia method using a combination of video and audio for recording facial and vocal expressions for emotion translation between cultures.

DE 195 02 627 A1 discloses a method and a transmitter/receiver apparatus that provide people who desire to establish contact with each other with means for initiating the contact. A contact-seeking person may transmit a signal that can be received by a person willing or ready to establish personal contact, who may, in turn, be notified by an acoustic or a visual signal.

DE 198 01 666 A1discloses a method of detecting received characteristic information and matching the received characteristic information with pre-stored characteristic information to detect and indicate a complete or partial match.

However, the prior art has not proposed any solutions to the problem that most people have difficulties remembering people that they do not meet very often. In some—typically business-related—situations people may have a business card of a person to help them remember details of that particular person. However, they may not be able to call the person to mind even though they have his or her business card in front of them.

In obtaining good relations with people that we do not meet very frequently, it may be of crucial importance to be able to recall impressions in our minds of people we have met before.

The above-mentioned problem is solved when the electronic device mentioned in the opening paragraph further comprises a processor with a memory for processing the audio and/or visual data to recognize the identity of the physical person, and for retrieving stored information about the recognized identity; and a user interface for providing the stored information to a user.

Consequently the electronic device can assist the user in remembering persons the user do not meet very often. This in turn may aid in obtaining improved business relations or an improved personal relationship.

Since it thereby is easier to call people to mind, less effort is spent wondering who is who. Further, a user's efforts in clearing up misunderstandings caused by confusing information on different people may be reduced. This in turn may lead to a more efficient use of time.

In an expedient embodiment the device comprises a microphone for acquiring the audio data; and a camera for acquiring the image data. Since both microphones and cameras are commercially available that have very small physical dimensions they can be built integrally with very small portable appliances.

Further, the processor can be arranged to process the audio data to determine the tone of voice of the person, and to store a representation of the tone of voice. This is convenient in that the tone of voice typically comprises much information about the person and in particular about the emotional state or mood of a speaking person.

Moreover, the processor can be arranged to associate a representation of a tone of voice with a representation of a mood. Thereby a given tone of voice can be associated with a predefined mood.

Besides, the processor can be arranged to process the image data to determine the facial expressions of the person, and to store a representation of the facial expression. Typically, facial expressions are related closely to the mood or emotional state of a person. This, in turn, provides the device with a good basis for registering or recognising the mood or emotional state of a person.

When the processor is arranged to associate a representation of a facial expression with a representation of a mood, a facial expression can be linked with a predefined type of mood.

The processor can be arranged to combine a representation of a facial expression and a representation of a tone of voice with a representation of a mood. Thereby a more detailed or robust registration/recognition of a mood can be achieved.

In a preferred embodiment the representation of tone of voice comprises values representative of speaking rate, pitch contour, or loudness of voice.

The processing of the audio/image data involves generating data that are characteristic for the person. Thereby a person can be recognised on the basis of recorded data.

In a preferred embodiment the device is arranged to provide a user with the option of storing information about a person and associating that information with the data that are characteristic for the person. Thereby a user can add his or her own notes or other types of information relating to a given person.

This is particularly expedient when the information comprises text, pictures, or image sequences.

When the device is arranged to store a history of representations of facial expressions and/or representations of tones of voice, a user can compile a history of the person. This can, in turn, assist the user in getting to know the person better.

When, the device is arranged to store a history of representations of mood, a more personal knowledge of the person may be obtained.

The device can be arranged to compare a current representation of mood with a previously stored representation in the history of representations of mood; and deliver information to the user about the comparison. This may aid the user in obtaining information about the person more quickly than by taking a detailed look of the history of recordings.

The invention also relates to a method.

The invention will be explained more fully below in connection with a preferred embodiment and with reference to the drawing, in which.

Figure 1:
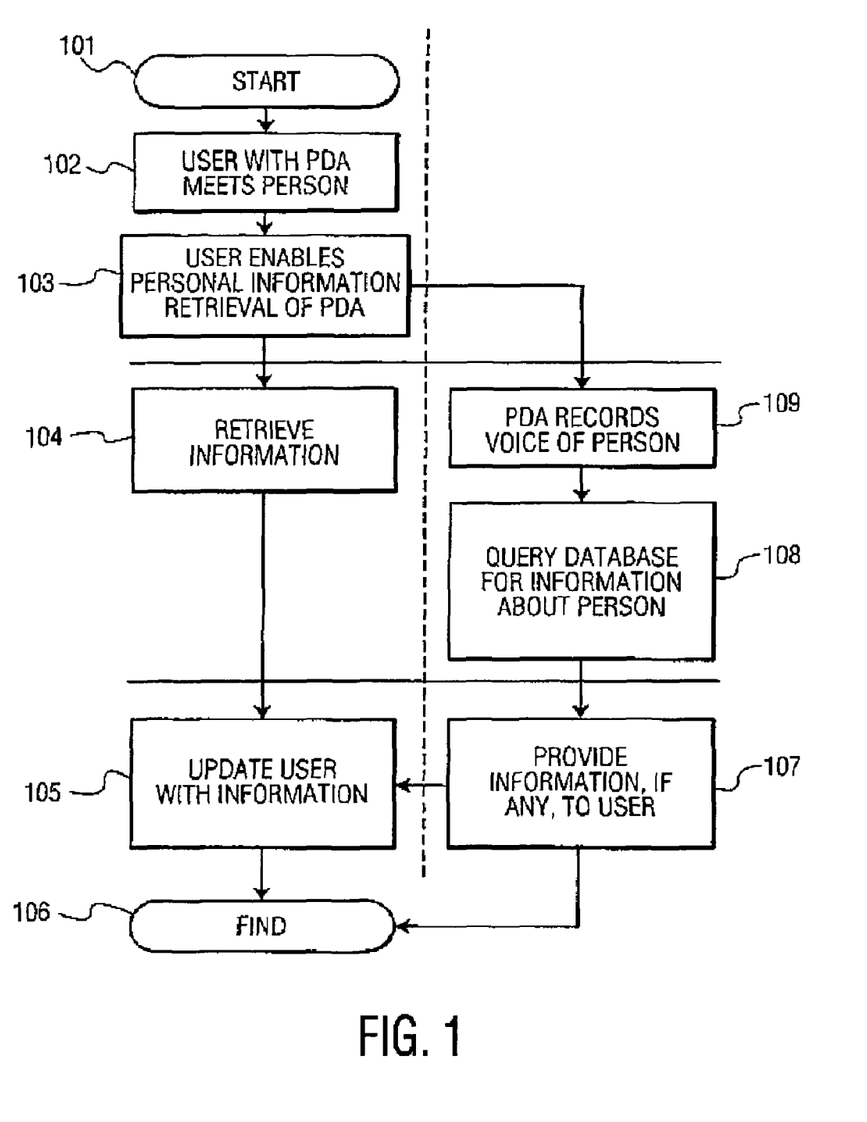
FIG. 1 shows a first flowchart for a method of retrieving information about a person.

FIG. 1 shows a first flowchart for a method of retrieving information about a person. The flowchart starts in step 101 leading to the first step in the method, step 102, wherein a user carrying a Personal Digital Assistant (PDA) meets a person. The user starts to talk to the person while wondering whether he has met the person before. Consequently, while the conversation is going on, the user enables a Personal Information Retrieval, PIR, function in his PDA in step 103.

While the conversion is ongoing, the PDA records the voice of the person in step 109 to obtain audio data. The audio data are processed in the PDA to identify the person by means of his or her voice. If the person can be identified, the PDA queries a database to find information about the person. This is carried out in step 108. If a result of the query indicates that information about the identified person is found, the user is notified that information about the person the user is currently talking to is found. This information is provided to the user in step 107. Consequently, the user may stop wondering whether he has met the person before since he is updated with information about the person in step 105. This information may comprise the user's own notes about the person. Subsequently, the conversation may go on or terminate before it ends in step 106. Thereby the user is updated with information about the person—for instance by providing an electronic business card with name, (business) address, etc. of the person.

Figure 2:
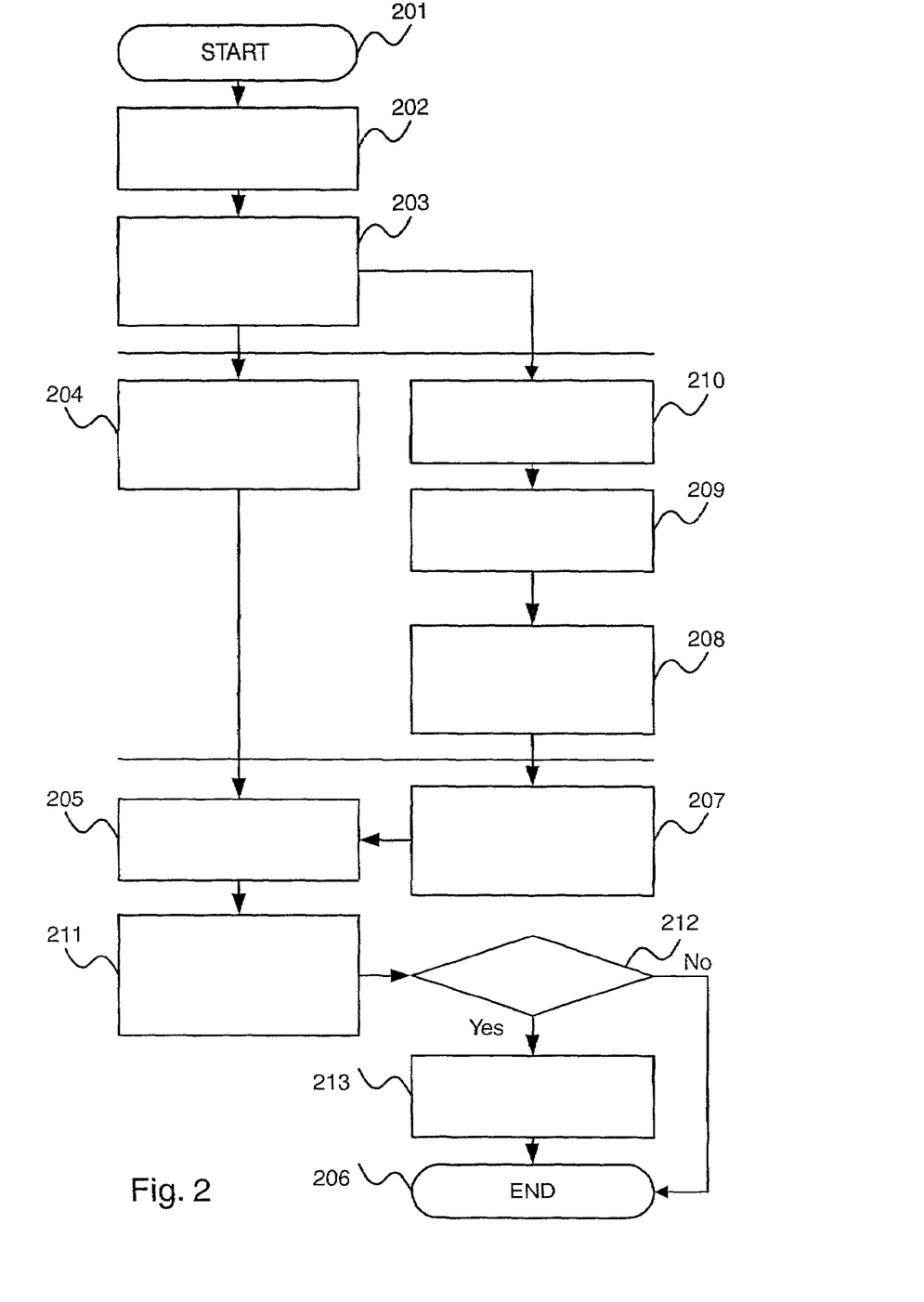
FIG. 2 shows a second flowchart for a method of retrieving information about a person.

FIG. 2 shows a second flowchart for a method of retrieving information about a person. The flowchart starts in step 201 leading to the first step of the method, step 202, wherein a user meets a person. The user starts to talk to the person while thinking that he must have met the person before, but he is not sure. Once again the user enables a Personal Information Retrieval function in his PDA in step 203. This involves that the user in step 204 is recording audio data of the person while the conversion is ongoing. Correspondingly, audio data is recorded by the PDA in step 210. However, also images/video can be recorded.

During this recording or immediately afterwards the data are processed to recognise the person to identify the person by means of his voice. If image/video data of the person is recorded, the person may be identified by means of his face or overall appearance.

If the person can be identified, the PDA queries a database, DB, to find information about the person in step 208. If a result of the query indicates that information about the identified person is found, the user is notified that information about the person the user has met is found and this information is supplied to the user in step 207. Consequently, the user is updated with this information in step 205. Subsequently, the conversation may continue in step 211.

During the conversation or afterwards, the user can operate the PDA in steps 212 and 213 to update, edit, or add information about the person that the user has just acquired during the conversation.

The method ends in step 206. In addition to or as an alternative to recording audio data, the user can record an image or a video sequence of the person. Subsequently, recorded image data can be processed to identify the person.

Figure 3:
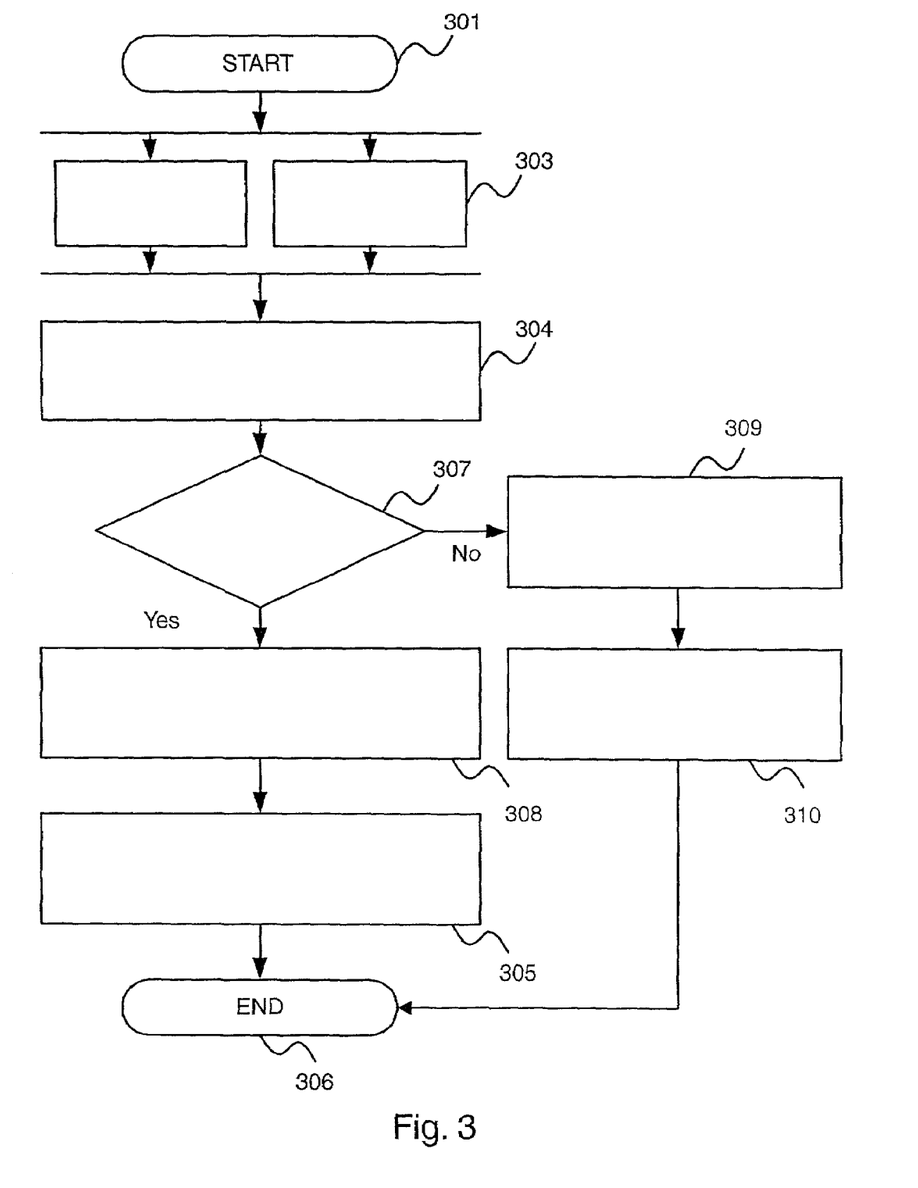
FIG. 3 shows a first flowchart for an apparatus for retrieving information about a person.

FIG. 3 shows a first flowchart for an apparatus for retrieving information about a person. This method is executed by a PDA in response to a user's commands to provide the user with means for recalling information about physical persons.

Upon receipt of a user's command in step 301, concurrent recordings of audio and image data carried out in step 303 and step 302, respectively. During these recordings or immediately after the recordings are finished, the video and image data are processed to extract features from the audio and video data that can be used to recognise a given person.

In step 307 it is verified whether the extracted features arranged in a feature profile match a previously stored feature profile. If a match is detected (Yes), a person associated with that profile is identified in step 308 and information previously stored and associated with the person is retrieved. Subsequently, in step 305 this information is provided to the user by means of a user interface.

Alternatively, if a match is not detected (No), a temporary anonymous person is created in step 309. That is, the feature profile is stored without associating a userspecified name with the profile. In step 310 a reference to the temporary anonymous person is created for subsequent addition of information by the user. This is expedient since the user then is allowed to enter information about a person when a conversation with a person has ended.

Figure 4:
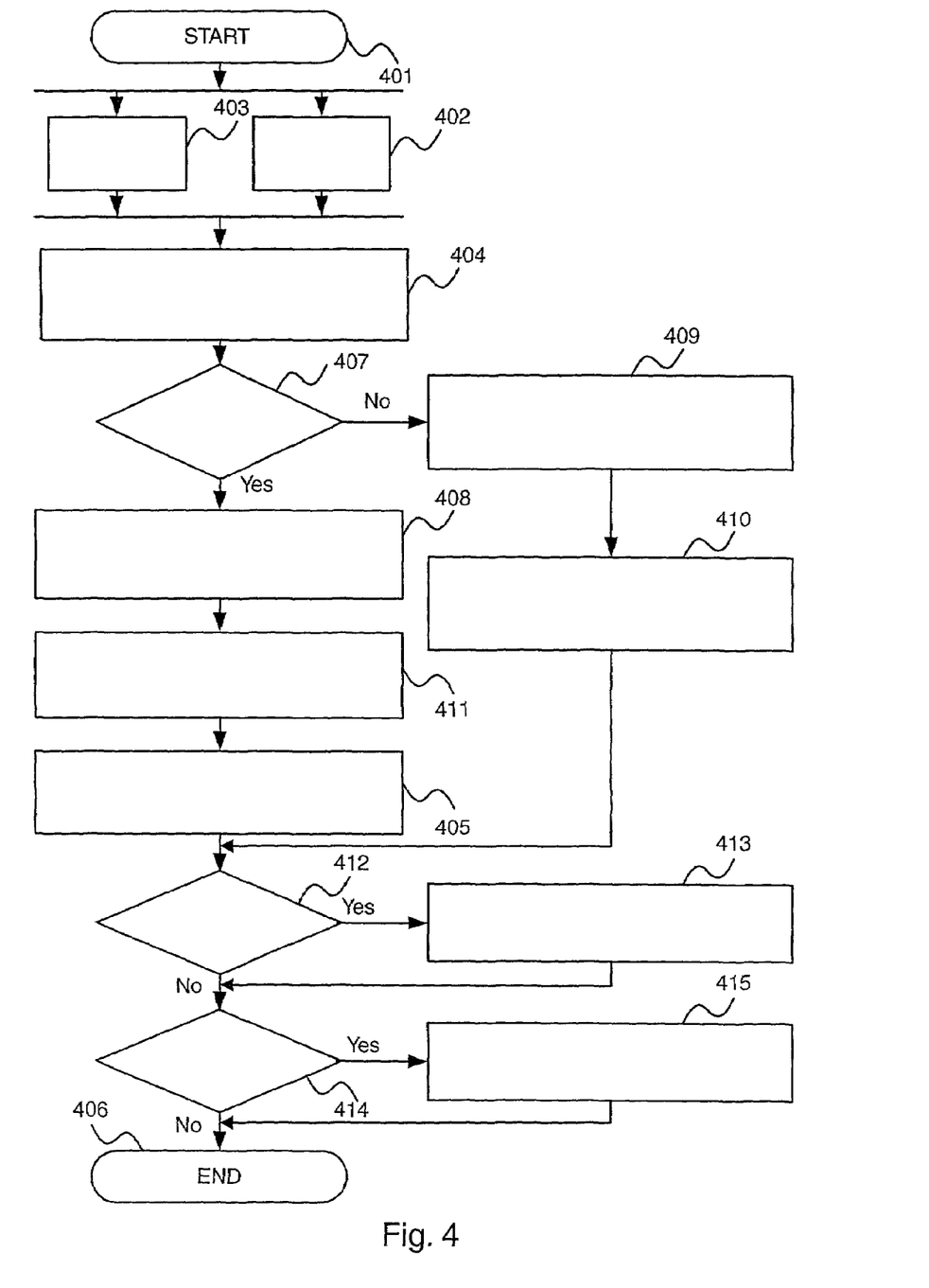
FIG. 4 shows a second flowchart for an apparatus for retrieving information about a person.

FIG. 4 shows a second flowchart for an apparatus for retrieving information about a person. Likewise, this method is executed by a PDA in response to a user's commands to provide the user with means for recalling information about physical persons. In this flowchart a user is provided with the option of storing and retrieving information about a person's mood and/or emotional/personal status.

Upon receipt of a user's command in step 401 concurrent recordings of audio and image data are carried out in step 403 and step 402, respectively. During these recordings or immediately after the recordings are discontinued, in step 404 the video and image data are processed to extract features from the audio and video data that can be used to recognise a given person.

In step 407 it is verified whether the extracted features arranged in a feature profile match a previously stored feature profile. If a match is detected (Yes), a person associated with that profile is identified in step 408 and information previously stored and associated with the person is retrieved. In the following step 411 the video and image data are processed to extract features from the audio and video data that can be used to recognise the mood or emotional/personal status of the identified person.

Subsequently, in step 405 information about the person and his or her mood or emotional/personal status is supplied to the user by means of a user interface.

Alternatively, if a match is not detected (No—in step 407), a temporary anonymous person created in step 409. In step 410 the user creates a reference to the temporary anonymous person for subsequent addition of information.

In the following step 412, the user has access to a user interface that enables him or her to edit and/or update information about a person. If the user selects such option, an editor is opened in step 413.

Likewise, in step 414 the user is provided with options of editing and/or updating information about a person's mood or emotional/personal status. If the user chooses to change this information, an editor is opened in step 415.

The method ends in step 406.

Figure 5:
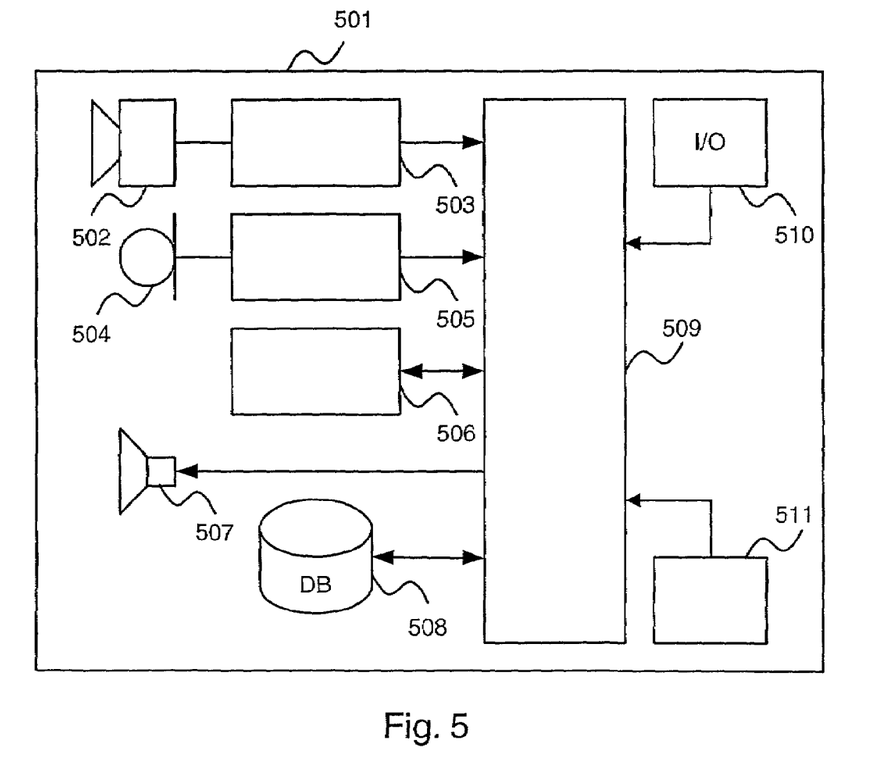
FIG. 5 shows a block diagram of an apparatus for storing and retrieving information about a person.

FIG. 5 shows a block diagram of an apparatus for storing and retrieving information about a person.

Reference numeral 501 generally designates a Personal Digital Assistant (PDA). The PDA comprises a central processor 509 for executing both basic Operating System (OS) processes and application processes/programs including programs for implementing the method according to the invention.

In order to process image data the processor is operatively connected to an image processor 503 for pre-processing image data from a camera 502.

Likewise, in order to process audio data the processor is also operatively connected to an audio processor 505 for pre-processing audio data from a microphone 504.

In order to enable a user to interact with the PDA it comprises user-interface means with an interactive display 506 and a loudspeaker 507. The interactive display is capable of providing information to a user by displaying text and graphics including images and video sequences.

The PDA is capable of receiving input from the user in that the interactive display is touch-sensitive. Thereby it is possible to make a keyboard appear on the interactive display. Alternatively, or additionally, a user's handwriting on the display can be interpreted.

In order to store information about a person the PDA comprises a database 508 for storing this information in a structured and searchable way.

For the purpose of communicating with a stationary computer, computers on the Internet, other PDAs, or other electronic equipment including mobile phones, the PDA comprises an input/output (I/O) interface 510. The I/O interface may be a wireless interface e.g. a so-called IrDa port or a Blue Tooth interface.

Since the PDA is a portable or mobile device it is primarily powered by a rechargeable battery 511.

Figure 6:
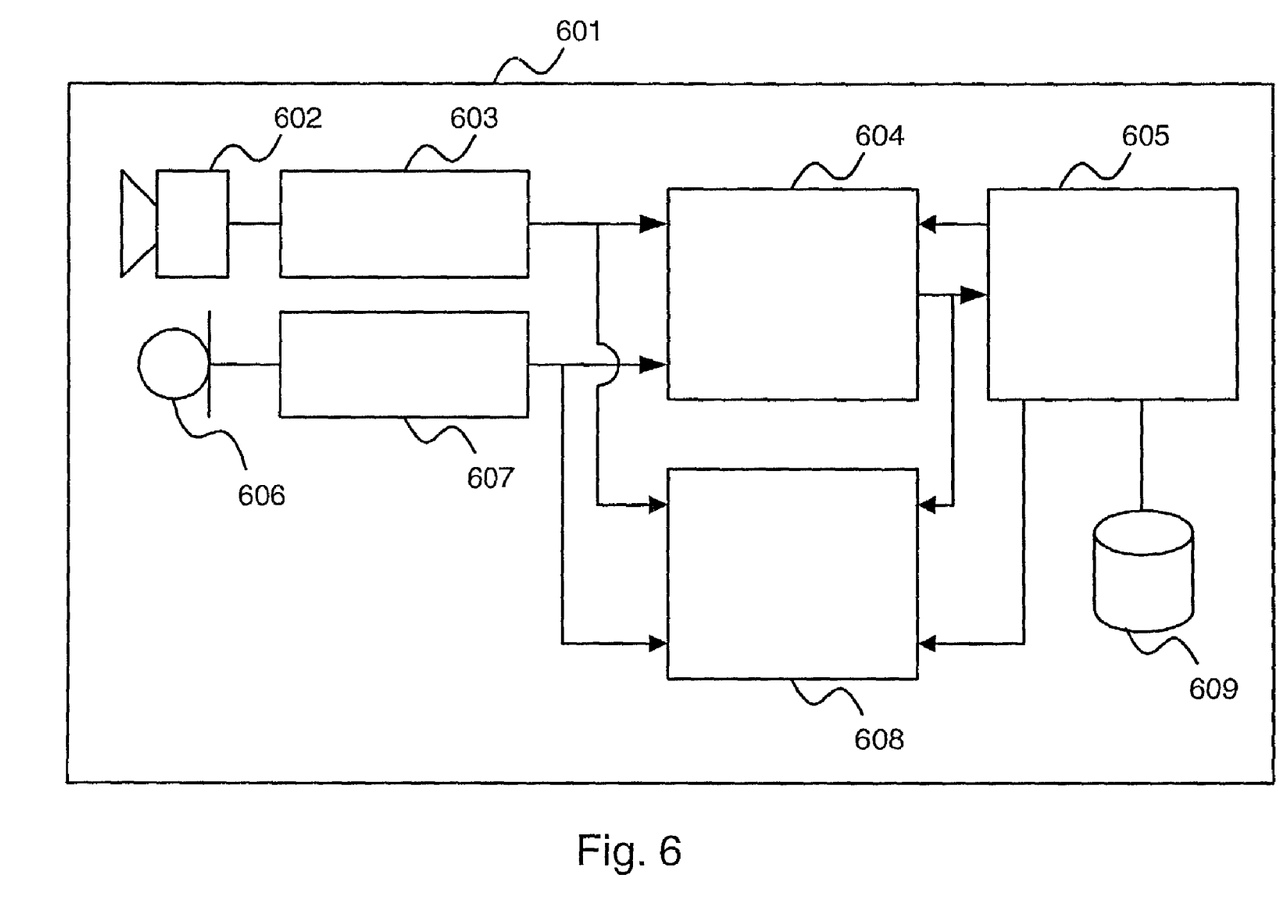
FIG. 6 shows a second block diagram of an apparatus for processing information about a person.

FIG. 6 shows a second block diagram of an apparatus for processing information about a person.

The block diagram comprises four main processing means: an image pre-processor 603, an audio pre-processor 607, a person-recognition processor 604, and a mood-recognition processor 608. Further, the image pre-processor 603 acquires image data from a camera 602 and the audio pre-processor 607 acquires audio data from a microphone 606. Via a user-interface 605 a user is provided with means for registering information about a recognised person's identity or a recognised/registered mood. This information is stored in a database 609.

In a preferred embodiment the image pre-processor 603 is arranged to process image data representing people's faces. This is expedient since people's faces comprise much information that can be used 1) to identify the particular person and 2) to determine the mood of the person.

The audio pre-processor 607 is arranged to process audio data representing people's voices and their tone of voice. This is expedient since people's voices comprise information that can be extracted by signal processing techniques and that is characteristic for an individual person. Likewise, in most situations, the tone of a person's voice is representative of the person's mood.

Thus, the pre-processors 603 and 607 are arranged to extract features that can be used 1) to identify a particular person and 2) to determine the mood of the person.

Features relating to identifying a particular person are supplied to the person-recognition processor 604; and features relating to determining the mood of a person are supplied to the mood-recognition processor 608. Thereby a given image and/or audio recording can be used both to recognise the identity of a person and to determine the person's mood.

Although the above-mentioned processors are very efficient at processing the image and audio data to discriminate between different moods or tones of voice for a given, person it is convenient that a user can modify registered mood information. Thereby a user can change a relation between a tone of voice and the mood of the associated person. The user interface 605 provides means for this.

Moreover, the user interface 605 can be used to register, update, or edit information about a person.

The block diagram can be implemented by a PDA, by a mobile phone, by a personal computer, by a laptop computer, by a client-server computer system or by another type of electronic equipment.

Figure 7:
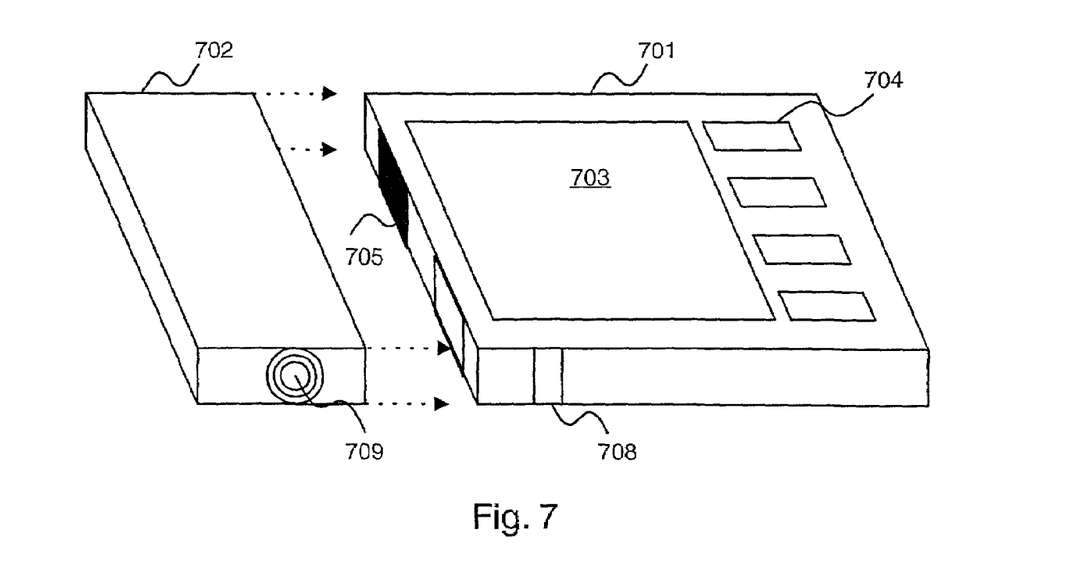
FIG. 7 shows a Portable Digital Assistant (PDA) with a camera unit and a microphone.

FIG. 7 shows a Portable Digital Assistant (PDA) with a camera unit and a microphone. In this embodiment of a PDA generally designated by reference numeral 701, it comprises an interactive display 703, a microphone 708 and buttons 704. The PDA has an interface 705 for connecting to a camera unit 702. The camera unit 702 comprises a camera 709 that can be operated either directly from the camera unit or from the PDA. Images recorded with the camera is transferred to the PDA via the interface 705.

It should be noted that the information stored about persons can include business cards with name, address, company name, e-mail address, web address, position, expertise, etc. Moreover the information can include notes about the contents of a meeting with the person, etc.

Moreover, it should be noted that alternatively or in addition to storing/processing a person's tone of voice the person's voice print can be stored/processed. A person's voice print can be extracted by processing speech data to identify the person based on the speech data. A voice print of a person can be considered to by unique to a person; the voice print is among other characteristics determined by the dimensions of the physical voice system of the person, for instance the length and width of his vocal tract.

The invention claimed is:

1. A method of providing information about a physical person, comprising:
recording audio and/or image data of the physical person;
processing the audio and/or visual data to recognize the identity of the physical person;
retrieving stored information about the recognized identity;
supplying the stored information to a user; and
enabling the user to identify and recall the person during a subsequent encounter between the user and the person.

2. The method according to claim 1 further comprising processing the audio data to determine the voice print and/or tone of voice of the person; and storing a representation of the voice print and/or tone of voice.

3. The method according to claim 2 further comprising associating a representation of a tone of voice with a representation of a mood.

4. The method according to claim 1 further comprising processing the image data to determine facial expressions of the person; and storing a representation of the facial expressions.

5. The method according to claim 4 further comprising associating a representation of a facial expression with a representation of a mood.

6. The method according to claim 1 further comprising providing a user with the option of storing information about a person and associating that information with data that are characteristic for the person.

7. An apparatus for providing information about a physical person, comprising:
- a recorder for recording audio and/or image data of the physical person;
- a processor with a memory for processing the audio and/or visual data to recognize the identity of the physical person, and for retrieving stored information about the recognized identity; and
- a user interface for supplying the stored information to a user such that the user is enabled to identify and recall the person during a subsequent encounter between the user and the person.

8. The apparatus according to claim 7 wherein the processor is arranged to associate a representation of a tone of voice with a representation of a mood.

9. The apparatus according to claim 7, wherein the processor is arranged to associate a representation of a facial expression with a representation of a mood.

10. The apparatus according to claim 7, wherein the processor is arranged to combine a representation of a facial expression and a representation of a tone of voice with a representation of a mood.

11. The apparatus according to claim 7, wherein the apparatus is arranged to provide a user with the option of storing information about a person and associating that information with data that are characteristic for the person.

12. The apparatus according to claim 7 arranged to compare a current representation of mood with a previously stored representation in a history of representations of mood; and supply information to the user about the result of the comparison.

* * * * *